(12) United States Patent
Budde

(10) Patent No.: US 6,757,138 B2
(45) Date of Patent: Jun. 29, 2004

(54) INTERCONNECT ROUTING FOR REDUCED AIRFLOW EXCITATION

(75) Inventor: Richard August Budde, Plymouth, MN (US)

(73) Assignee: Seagate Technology LLC, Scotts Valley, CA (US)

(*) Notice: Subject to any disclaimer, the term of this patent is extended or adjusted under 35 U.S.C. 154(b) by 161 days.

(21) Appl. No.: 10/125,144

(22) Filed: Apr. 18, 2002

(65) Prior Publication Data

US 2003/0099068 A1 May 29, 2003

Related U.S. Application Data

(60) Provisional application No. 60/333,623, filed on Nov. 27, 2001.

(51) Int. Cl.[7] .................................................. G11B 5/54
(52) U.S. Cl. .................................................. 360/245.9
(58) Field of Search ........................... 360/245.9, 245.8, 360/264.2

(56) References Cited

U.S. PATENT DOCUMENTS

| | | | | |
|---|---|---|---|---|
| 5,311,384 A | * | 5/1994 | Johnson | 360/245.8 |
| 5,583,720 A | * | 12/1996 | Ishida et al. | 360/97.01 |
| 5,661,896 A | * | 9/1997 | Erpelding | 29/603.01 |
| 5,864,445 A | * | 1/1999 | Bennin et al. | 360/245.9 |
| 6,014,290 A | * | 1/2000 | Supramaniam et al. | 360/245.9 |
| 6,154,343 A | * | 11/2000 | Khan et al. | 360/245.9 |
| 6,477,014 B1 | * | 11/2002 | Erpelding | 360/245.9 |
| 6,515,832 B1 | * | 2/2003 | Girard | 360/245.3 |
| 6,636,383 B1 | * | 10/2003 | Chew | 360/245.9 |

\* cited by examiner

*Primary Examiner*—Jefferson Evans
(74) *Attorney, Agent, or Firm*—Merchant & Gould P.C.

(57) ABSTRACT

A disc drive has an improved electrical interconnect assembly mated to a suspension assembly for coupling one or more conductive paths leading from a read/write head to control circuitry located off the suspension assembly. The interconnect assembly has a portion that is located adjacent to and transversely extending from an edge of the suspension assembly located towards the inner diameter of a disc on the disc drive. The suspension optionally includes a cross-over section of the interconnect assembly to electrically couple the head on the suspension to the control circuitry located away from the suspension assembly. Locating the interconnect assembly on the edge of the suspension towards the disc inner diameter reduces windage induced vibrations of the suspension assembly and, consequently, the head.

20 Claims, 6 Drawing Sheets

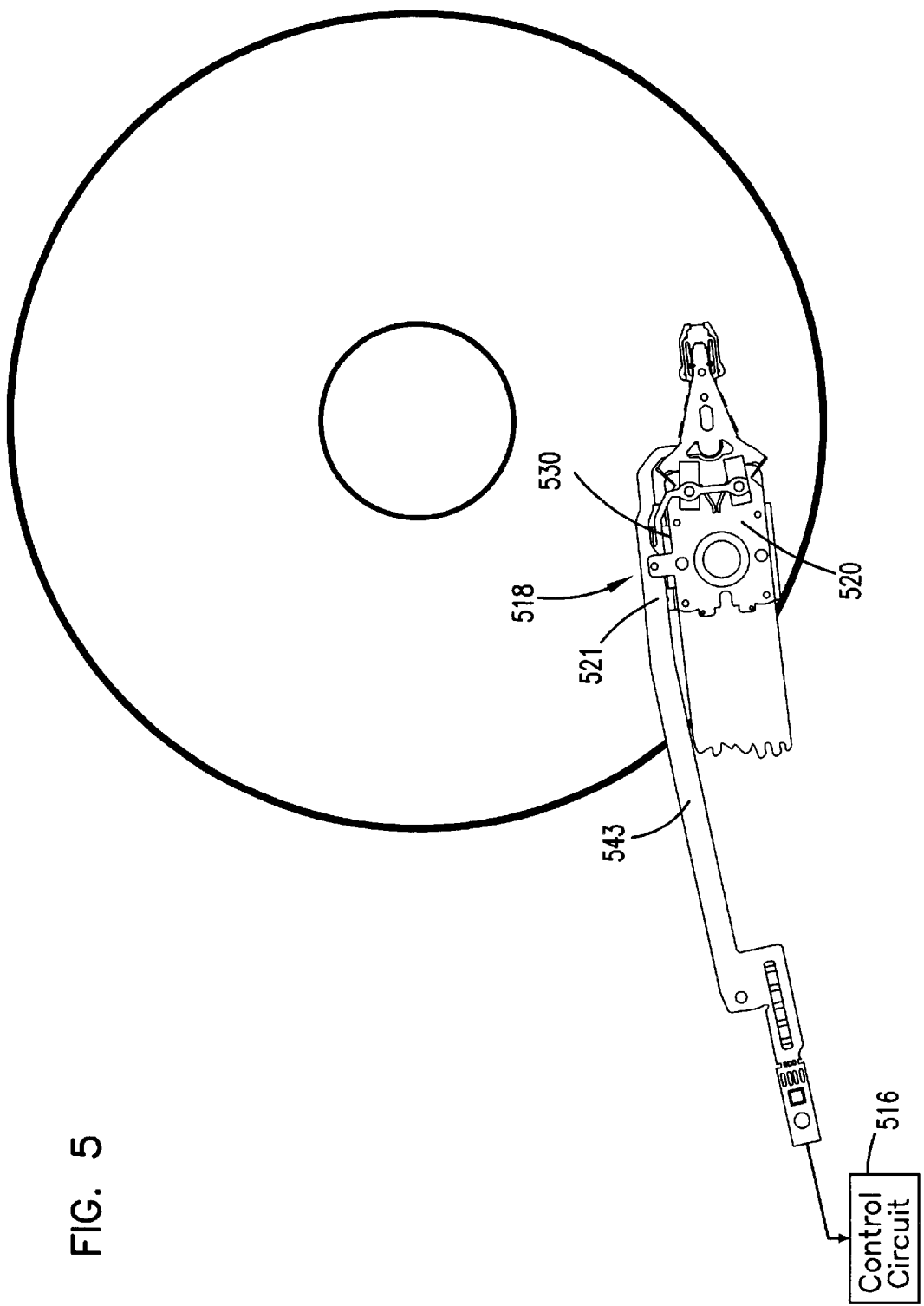

INTERCONNECT ROUTING FOR REDUCED AIRFLOW EXCITATION

RELATED APPLICATIONS

This application claims priority of U.S. provisional application Serial No. 60/333,623, filed Nov. 27, 2001, entitled "Interconnect Routing For Reduced Airflow Excitation".

FIELD OF THE INVENTION

The present invention relates to suspension assemblies for supporting a head in disc drives, and more particularly to an apparatus to reduce windage-induced vibration of the head by routing an interconnect assembly along a leading edge of the suspension assembly.

BACKGROUND OF THE INVENTION

In a disc drive system, air currents are induced when one or more discs are rotating at high speeds. The air currents, or windage, cause undesirable effects, such as causing components in the system to vibrate. Such vibration is undesirable because it can introduce errors in the performance of the disc drive. One component that is adversely affected by this windage-induced vibration is the suspension assembly. The suspension assembly is used to support/suspend a recording/reading head, and is mated with an interconnect assembly, which is used to electrically connect the recording/reading head to disc drive electronics which are disposed away from the recording/reading head and off the suspension assembly.

One type of interconnect assembly is a flex on suspension, or flex circuit. Flex circuit type of interconnect assemblies are a separately fabricated printed circuit that is subsequently assembled to the suspension assembly, e.g., using an adhesive material. The flex circuit is relatively less expensive and easier to manufacture than the other types of interconnect assemblies.

Other types of interconnect assemblies are twisted wires, trace suspension assemblies and circuit integrated suspension. Twisted wires assemblies are a bundle of wires glued to the suspension assembly. A trace suspension assembly includes a unitary steel gimbal with electrical traces that is welded onto the suspension assembly. A circuit integrated suspension assembly deposits traces directly onto the suspension assembly by a sputtering process.

In general, the flex circuit is mated to a finished suspension assembly. The flex circuit is quite flexible along its entire length. The head portion of the flex circuit is attached to the suspension. However, the tail portion of the flex circuit is generally not attached to the suspension and hangs freely.

FIG. 1 shows a partial view of a disc drive system 110 of the prior art, including a suspension assembly 120 mated to an interconnect assembly 118. The suspension assembly 120 includes a windward edge 130 oriented towards the incoming direction A of airflow induced by a rotating disc 112 and also includes a leeward, or trailing, edge 132 oriented opposite the incoming direction A of airflow. Referring to FIGS. 1 and 2, the interconnect assembly 118 is mated to the suspension assembly 120, and has a tail 143 that runs along the leeward edge 132 of the suspension assembly 120. The interconnect assembly 118 electrically couples a head 122 supported by the suspension assembly 120 to a control circuit 116 located remotely from the head 122. An overhang section 121 of the tail 143 is located adjacent to the leeward edge 132 of the suspension assembly 120 and extends transversely from the leeward edge 132. This arrangement allows for the interconnect assembly 118 to connect with control circuitry 116 located off the suspension assembly 120.

As the data density on the disc is continually increasing, it becomes more critical to eliminate or reduce factors that introduce error into the head reading and writing data. Since vibration of the suspension assembly is one factor that affects the operation of the head, a need exists for reducing windage-induced vibration of the head caused by the suspension assembly.

SUMMARY OF THE INVENTION

Against this backdrop the present invention has been developed. In one example embodiment, the invention is directed to an apparatus for reducing windage-induced vibration in a disc drive having a rotating disc, wherein the disc has an inner and an outer diameter. The apparatus includes a suspension assembly supporting a head and having a first and a second edge, the first edge being oriented towards the disc inner diameter when the suspension assembly is assembled into the disc drive. The apparatus further includes an interconnect assembly mated to the suspension assembly. The interconnect assembly includes a tail and the tail includes an overhang section located adjacent to and extending transversely from the first edge of the suspension assembly.

In another example embodiment, the invention is directed to a disc drive system including a rotating disc having an inner and an outer diameter, and a suspension assembly supporting a head and having a first edge disposed towards the disc inner diameter and a second edge disposed towards the disc outer diameter. The system further includes an interconnect assembly for electrically connecting the head to electronic control circuitry, wherein the interconnect assembly includes a tail having an overhang section located adjacent to and extending transversely from the first edge of the suspension assembly.

Another example embodiment is directed to a system for reducing windage-induced vibration of a suspension assembly, wherein the suspension assembly includes a windward edge. The system includes a head supported on the suspension assembly, with the head being in electrical contact with electronic control circuitry. The system further includes means for reducing windage-induced vibration located on the windward edge of the suspension assembly, with the means containing a conductive path between the head and the electronic control circuitry.

These and various other features as well as advantages which characterize the present invention will be apparent from a reading of the following detailed description and a review of the associated drawings.

BRIEF DESCRIPTION OF THE DRAWINGS

FIG. 5 is a plan view of another example embodiment of an interconnect assembly of the present invention mated to a suspension assembly.

DETAILED DESCRIPTION

Figure 3:
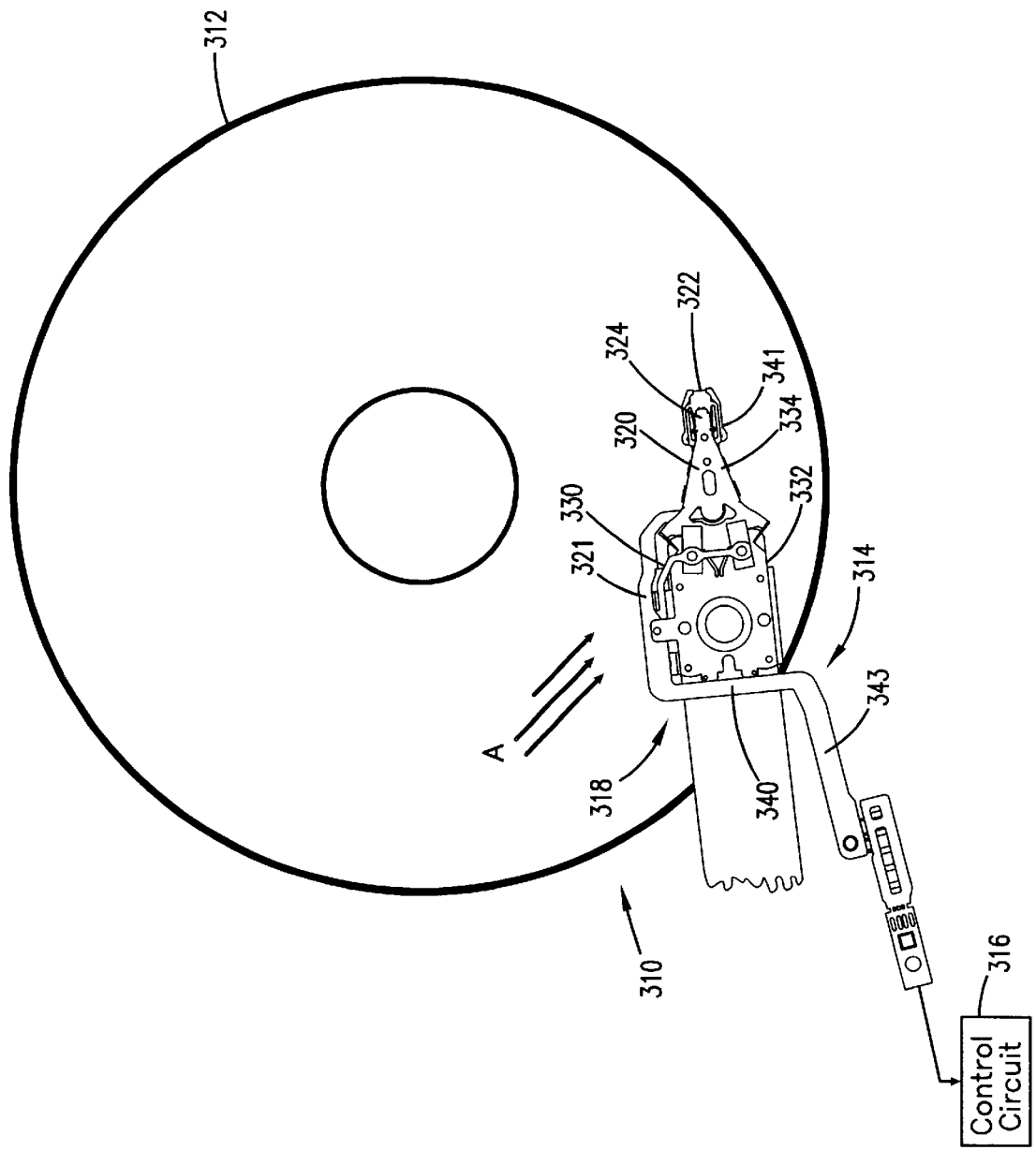
FIG. 3 a plan view of a disc drive system including an example embodiment of an interconnect assembly of the present invention.

Referring to FIG. 3, shown is a disc drive system 310 incorporating an example embodiment of a suspension assembly 320 mated to an interconnect assembly 318 of the present invention. Disc drive system 310 generally includes a disc 312, an arm arrangement (not shown), control circuitry 316 and interconnect assembly 318. As is conventionally known, disc 312 contains magnetically encoded information and is rotated by a spindle motor. Arm arrangement is supported above disc by an actuator assembly and generally includes actuator arm, support arm, suspension assembly 320 and a head 322. Actuator arm extends from an actuator and attaches to support arm. Support arm extends from actuator arm and is attached to suspension assembly 320.

Figure 1:
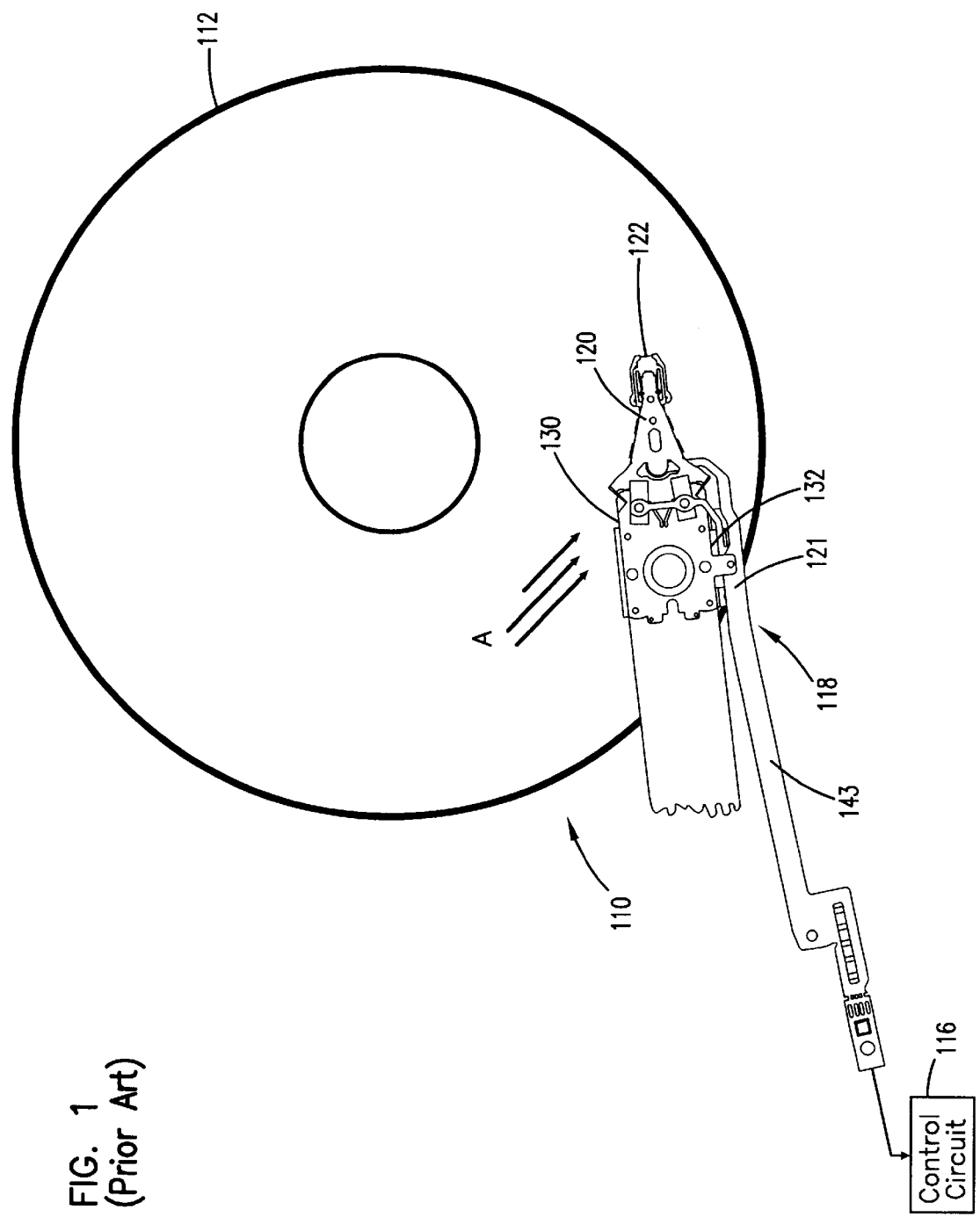
FIG. 1 is a plan view of a disc drive system including a interconnect assembly mated to a suspension assembly of the prior art.
Figure 2:
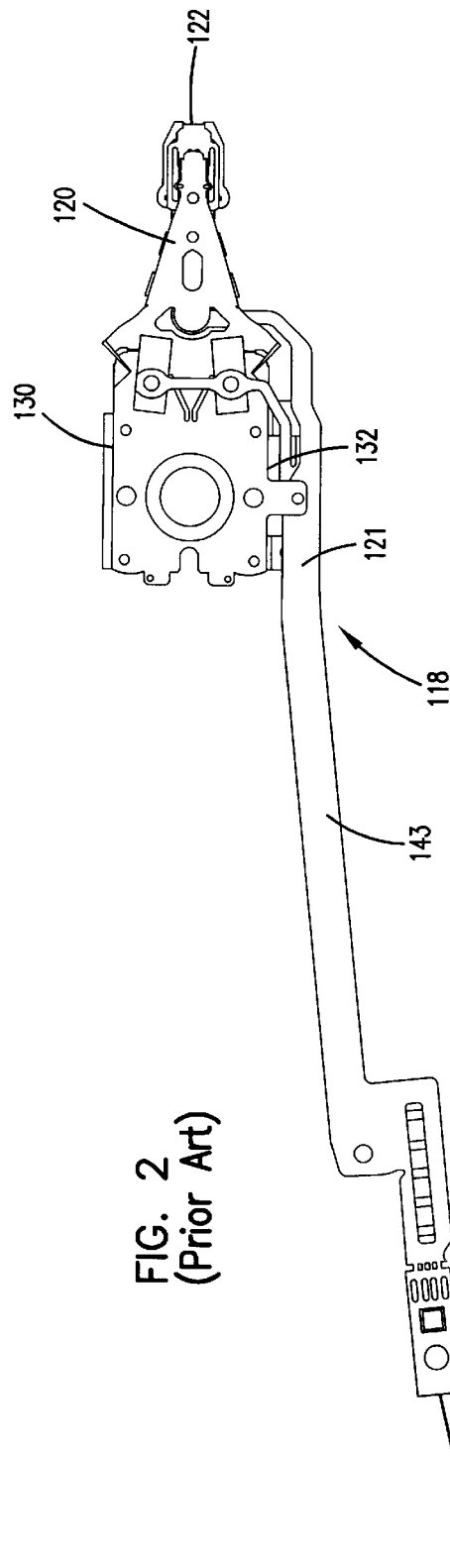
FIG. 2 is a close-up plan view of the interconnect assembly mated to the suspension assembly of FIG. 1.
Figure 4:
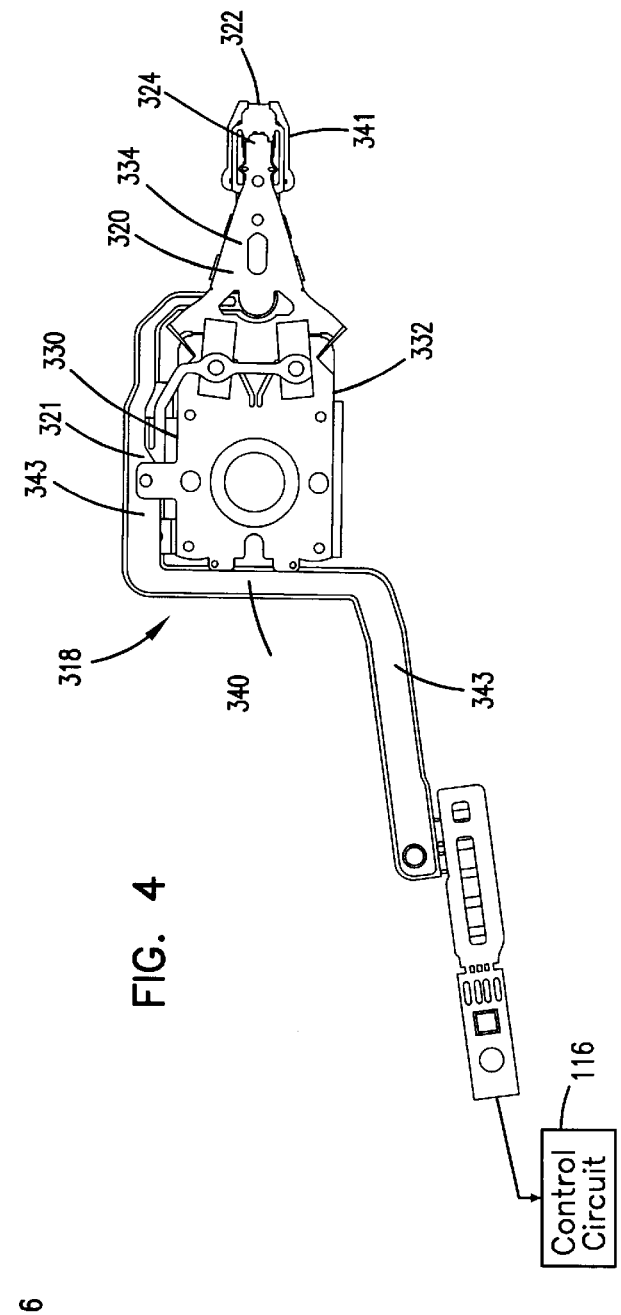
FIG. 4 is a close-up plan view of the interconnect assembly of FIG. 3.

Referring to FIGS. 3 and 4, the disc drive system 310 includes a suspension assembly 320 having a load beam 334 and a gimbal portion 324. Suspension assembly 320 is attached to head 322, which is located on the gimbal portion 324 of the suspension assembly 320, preferably by an adhesive such as glue or fluid epoxy. Alternatively, head 322 may be mounted to suspension assembly 320 by other conventional mounting methods well known in the art. Suspension assembly 320 cooperates with an arm (not shown), which is connected to the actuator arm, to resiliently support head 322 in the vertical direction to allow head 322 to read and write data to the disc 312.

As the disc drive system 310 operates, disc 312 rotates and induces airflow that includes a radial and a tangential component. As a result of the combined components, strong currents are created, and the resulting airflow causes windage-induced vibration of the suspension assembly 320. The effects of the windage-induced vibration cause the head 322 to vibrate, thus affecting the vertical spacing between the head 322 and the disc 312. The airflow impinges upon a windward, or leading, edge 330 of the suspension assembly 320 and creates a turbulent wake on the leeward, or trailing, edge 332 of the suspension assembly 320. An advantage of the present invention is that it reduces windage-induced vibration that affects the vertical spacing between the head 322 and the disc 312, as will be discussed.

Disc drive system 310 also includes interconnect assembly 318 to complete the electrical connection between the head 322 and the control circuitry 316. Preferably, the interconnect assembly 318 is a flex on suspension, or flex, circuit made from a polyimide substrate, with manufacturing techniques for flex circuits being well known in the art. Interconnect assembly 318 includes a head 341, a tail 343, and electrical conductors (not shown) which extend from the head 322 to the control circuitry 316 and electrically transmits electrical signals between the head 322 and the control circuitry 316. Referring to the example embodiment shown in FIG. 4, the interconnect assembly 318 is mated to the suspension assembly 320. The interconnect assembly 318 and suspension assembly 320 can be mated using a variety of techniques well know to one of skill in the art, for example, using glue or epoxy.

To reduce windage-induced vibration, the tail 343 includes an overhang section 321 located adjacent to and extending transversely from the windward edge 330 of the suspension assembly 320. The windward edge 330 is disposed towards the inner diameter of the disc 312. The tail 343 of the interconnect assembly 318 can also include a cross-over section 340 that traverses the suspension assembly 320 from the leading edge 330 to the trailing edge 332, and then continues along the trailing edge 332 so that the electrical conductors (not shown) complete the electrical connection between the head and the control circuitry 316. The trailing edge 332 is disposed towards the outer diameter of the disc 312. From the cross-over section 340, the electrical conductors of the interconnect assembly 318 continue to complete the electrical path between the head 322 and the control circuitry 316.

Referring to FIG. 5, in another example embodiment, a tail 543 of an interconnect assembly 518 includes an overhang section 521 located adjacent to and extending transversely from a windward edge 530 of a suspension assembly 520. Instead of having a cross-over section, the tail 543 continues to run along the windward edge 530 of the suspension assembly 520 to connect with control circuitry 516.

Figure 6:
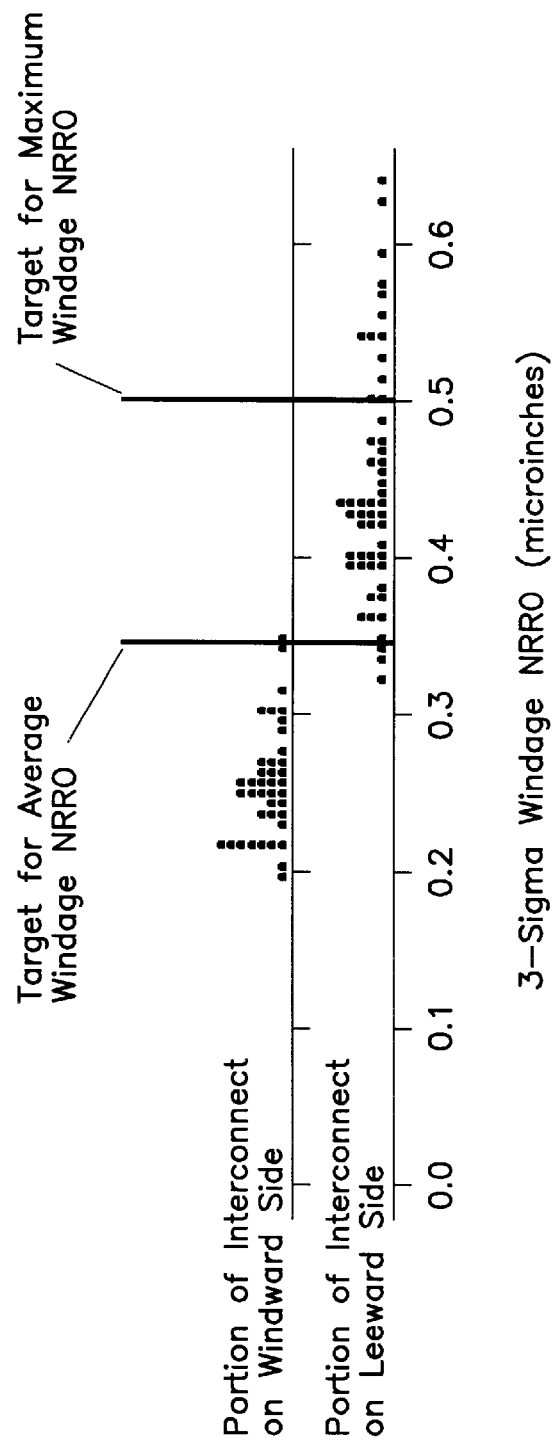
FIG. 6 is a chart showing a histogram of non-repeatable runout for component level test data from laboratory tests contrasting system performance with the interconnect assembly on the leeward side of a suspension assembly vs. the interconnect assembly on the windward side of the suspension assembly.
Figure 7:
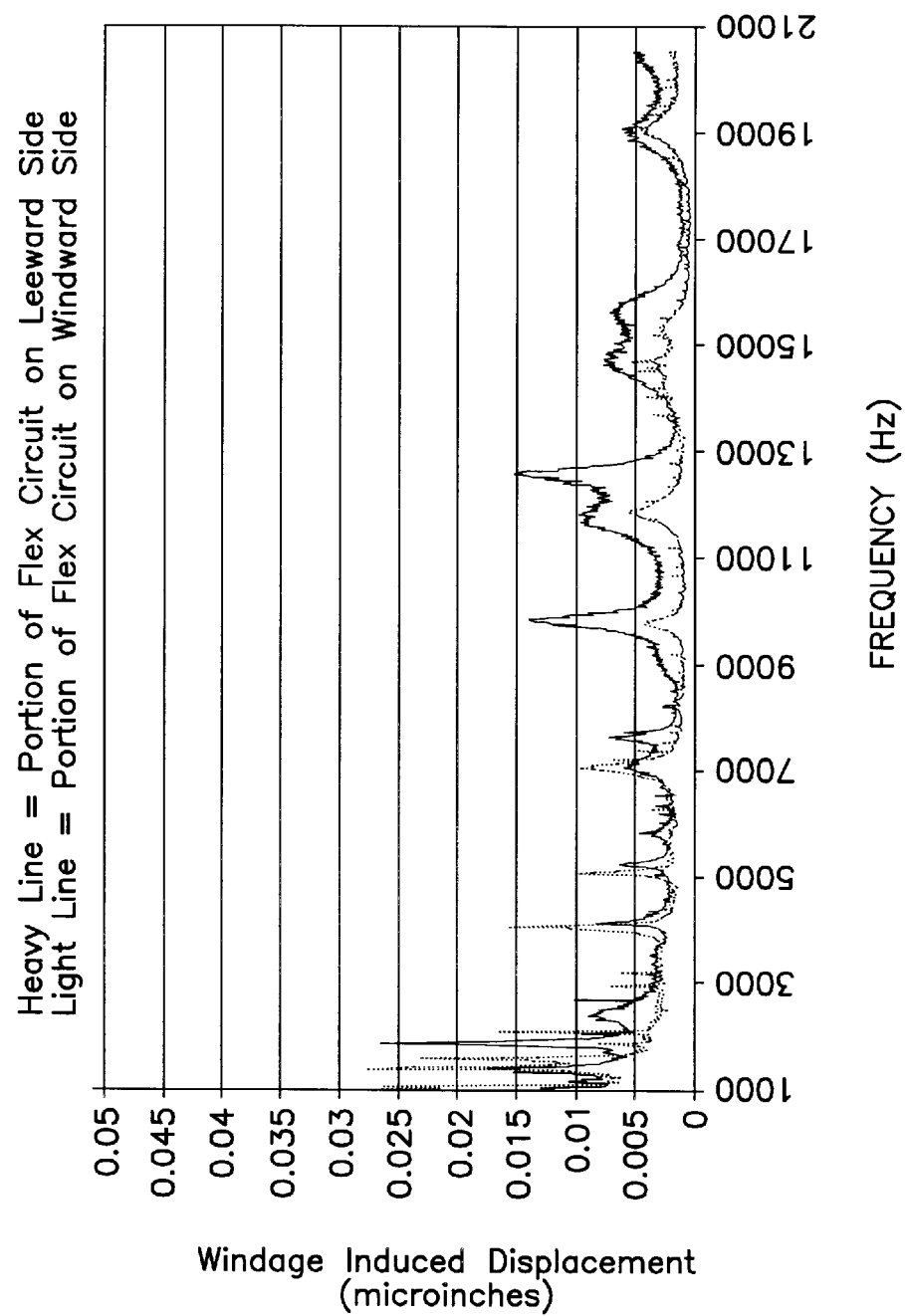
FIG. 7 is a graph showing the results of laboratory tests measuring the frequency response of head amplitude of vibration contrasting system performance with the interconnect assembly on the windward side of the suspension assembly vs. the interconnect assembly on the leeward side of the suspension assembly.

Applicant has conducted laboratory experiments using an embodiment of the present invention to measure the effect of having the overhang section on the windward side of a suspension assembly compared to the prior art suspension assembly having an interconnect assembly on the leeward side. It has been found that the present invention significantly reduces windage-induced vibration of the suspension assembly, and consequently, the head. Referring to FIGS. 6 and 7, test data from laboratory experiments is shown comparing windage-induced vibration of a suspension assembly incorporating an interconnect assembly of the prior art to windage-induced vibration of a suspension assembly incorporating an example embodiment of an interconnect assembly of the present invention. One measure of the vibration of the suspension assembly is non-repeatable runout, which is defined as the non-repeatable vibration of the head due to random factors (NRRO). As is shown in FIG. 6, it has unexpectedly been found that the non-repeatable runout (NRRO) is much less for a suspension assembly mated to an interconnect assembly located on the windward edge than for a suspension assembly mated to an interconnect assembly of the prior art. The test results show that the non-repeatable runout head vibration is greatly reduced by locating an overhang portion of interconnect assembly on the windward side of the suspension assembly.

Similarly, as shown in FIG. 7, the vibration measured at the head for a suspension assembly mated to interconnect assembly of the prior art is much greater than the vibration measured at the head for a suspension assembly mated to an example embodiment of an interconnect assembly of the present invention. The test results show that vibration of the head is greatly reduced by locating a portion of the interconnect assembly on the windward side of the suspension assembly. This effect is especially pronounced at frequencies above 9.0 KiloHertz.

As can been seen from FIGS. 6 and 7, an advantage of the present invention is that it greatly reduces vibration of the suspension assembly as measured at the head (a critical parameter for accurate data transfer between the disc and the head), thus reducing the introduction of errors due to windage-induced vibration.

It will be clear that the present invention is well adapted to attain the ends and advantages mentioned as well as those inherent therein. While presently preferred embodiments have been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. An apparatus for reducing windage-induced vibration in a disc drive having a rotating disc, the disc having an inner and an outer diameter, the apparatus comprising:

a suspension assembly supporting a head and having a first edge and a second edge, the first edge being oriented towards the disc inner diameter when the suspension assembly is assembled into the disc drive; and an interconnect assembly having a tail, the tail including an overhang section located adjacent to and extending transversely from the first edge of the suspension assembly, the overhang section being arranged and configured to create a turbulent air wake at the second edge of the suspension assembly, thereby reducing windage-induced vibration in the disc drive.

2. The apparatus of claim 1 wherein the tail further includes a cross-over section from the first edge of the suspension assembly to the second edge of the suspension assembly.

3. The apparatus of claim 2 wherein the cross-over section is located on a load beam section of the suspension assembly.

4. The apparatus of claim 1 wherein the interconnect assembly is a flex-on-suspension circuit.

5. The apparatus of claim 1 wherein the interconnect assembly is made from a polyimide substrate.

6. The system of claim 1 wherein the overhang section extends along the first edge of the suspension assembly and not along the second edge of the suspension assembly.

7. The system of claim 1 wherein the overhang section is held adjacent to and extending transversely from the first edge of the suspension assembly with a support tab.

8. The system of claim 1 wherein the overhang section of the interconnect assembly includes all circuitry for the head supported by the load beam.

9. A disc drive system comprising:

a rotating disc having an inner and an outer diameter;

a suspension assembly for supporting a head, the suspension assembly having a first edge disposed towards the disc inner diameter and a second edge disposed towards the disc outer diameter; and an interconnect assembly for electrically connecting the head to electronic control circuitry, wherein the interconnect assembly includes an overhang section located adjacent to and extending transversely from the first edge of the suspension assembly, the overhang section being arranged and configured to create a turbulent air wake at the second edge of the suspension assembly, thereby reducing windage-induced vibration in the disc drive.

10. The system of claim 9 wherein the interconnect assembly further includes a cross-over section from the first edge of the suspension assembly to the second edge of the suspension assembly.

11. The system of claim 10 wherein the cross-over section is located on a load beam section of the suspension assembly.

12. The system of claim 9 wherein the interconnect assembly is a flex-on-suspension circuit.

13. The system of claim 9 wherein the interconnect assembly is made from a polyimide substrate.

14. The system of claim 9 wherein the overhang section extends along the first edge of the suspension assembly and not along the second edge of the suspension assembly.

15. The system of claim 9 wherein the overhang section is held adjacent to and extending transversely from the first edge of the suspension assembly with a support tab.

16. A system for reducing windage-induced vibration of a suspension assembly, the suspension assembly having a windward edge, the system comprising:

a head supported on the suspension assembly, the head being in electrical communication with electronic control circuitry;

means for reducing windage-induced vibration located on the windward edge of the suspension assembly, the means containing a conductive path between the head and the electronic control circuitry.

17. The system of claim 16 further including a cross-over section from the windward edge of the suspension assembly to a leeward edge of the suspension assembly.

18. The system of claim 17 wherein the cross-over section is located on a load beam section of the suspension assembly.

19. The system of claim 16 wherein the means for reducing windage-induced vibration is a flex-on-suspension circuit.

20. The system of claim 19 wherein the means is made from a polyimide substrate.

* * * * *